Figure 1:
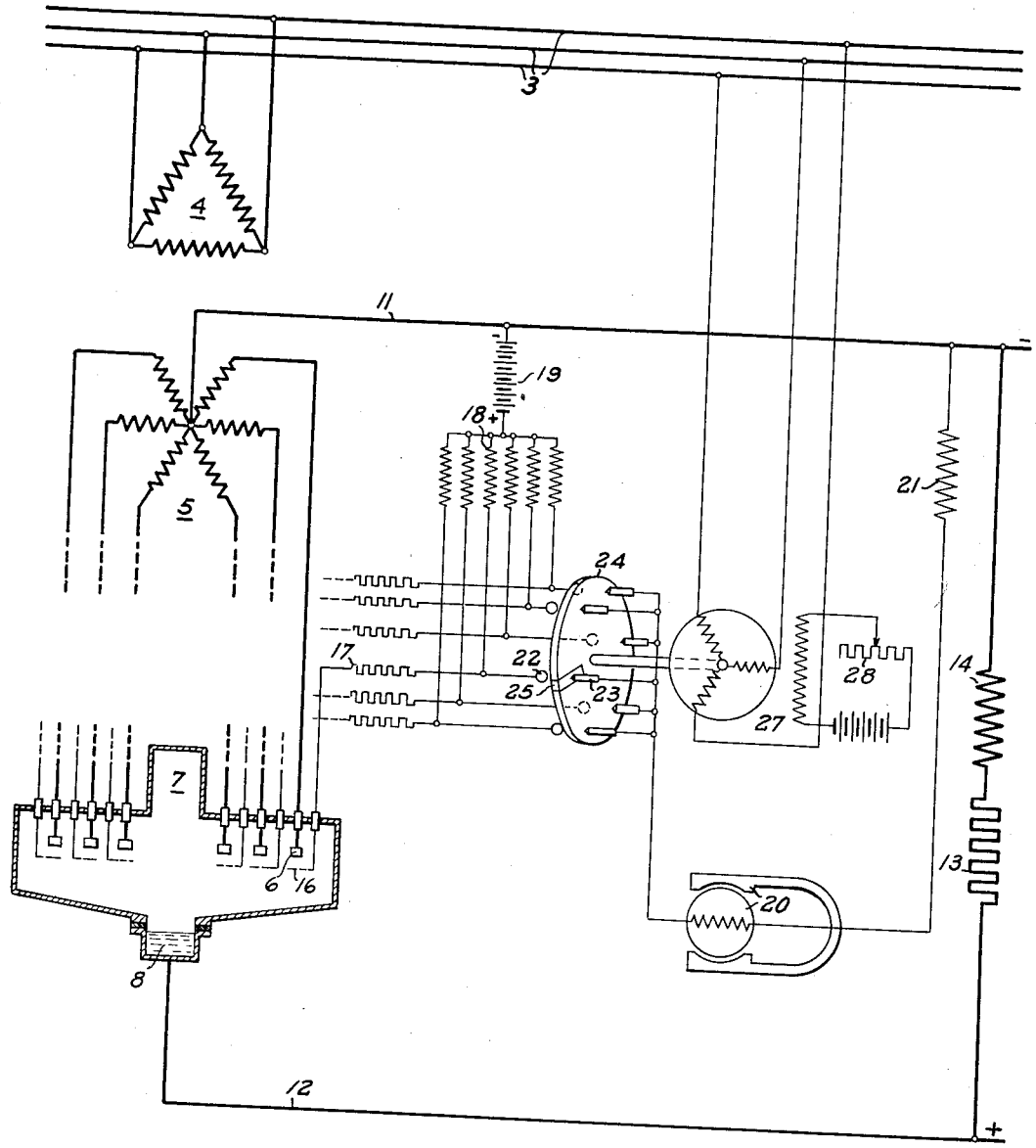

Nov. 7, 1933. J. JONAS 1,933,856
ELECTRIC CURRENT RECTIFIER CONTROL SYSTEM
Filed June 10, 1932    2 Sheets-Sheet 1

Patented Nov. 7, 1933

1,933,856

UNITED STATES PATENT OFFICE 1,933,856

ELECTRIC CURRENT RECTIFIER CONTROL SYSTEM

Julius Jonas, Baden, Switzerland, assignor to Aktiengesellschaft Brown Boveri & Cie., Baden, Switzerland, a joint stock company of Switzerland Application June 10, 1932, Serial No. 616,439, and in Germany June 12, 1931

9 Claims. (Cl. 175—363)

This invention relates to improvements in electric current rectifying systems employing electric current rectifiers of the metallic vapor arcing type and more particularly to means for controlling the operation of such rectifiers.

Electric current rectifiers of the metallic vapor arcing type may be, at least, partially controlled by control electrodes associated with the anodes and connected with means for varying the potential impressed thereon. Thus, the impression on the control electrodes of a potential which is above the potential of the cathode will prevent the associated anode from picking up an arc already produced in the rectifier and maintained therein by well known means as is usual and, therefore, not described herein. Such positive potential may be either a direct current potential or a combination of alternating current potential and direct current potential. When a direct current potential only is used, it is necessary that the positive terminal of the potential source be intermittently connected with the control electrodes to permit the associated anode to pick up the arc and that the negative terminal of the source be connected with the control electrodes at times when the anode is to be prevented from picking up the arc. The simplest method so far known for using a direct current control potential for the control electrodes of an electric current rectifier consists in the continuous connection of the negative terminal with the control electrodes and the intermittent connection of the positive terminal of the potential source with the control electrodes by means of a switch in the nature of a distributor. Such switch requires a brush moving over the contacts connected with the several control electrodes which contacts are preferably then arranged in a circle. The operation of a rotating switch for connecting the positive terminal of the potential source with the control electrodes may readily be controlled by the use of a motor operating in synchronism and in phase with the alternating current supply potential, variation of the excitation of the motor permitting variation in the moment of the alternating current supply cycle at which the positive potential is applied to the control electrodes. Such switch is, however, relatively expensive and requires frequent inspection and service to maintain the contacts thereof in the proper operating condition.

The use of a switch having contacts moving in engagement with each other may be avoided if the control potential is a combined direct current and alternating current potential and if means are provided by which the total of the potentials impressed on the control electrodes is varied to values above and below cathode potential at the moments in the cycle of the alternating current supply at which an arc is to be picked up or such picking up of the arc by the associated anodes is to be prevented. Such variation of the impressed potential is, however, difficult to obtain and must be produced either by regulation of the direct current component or by rotation of the phases of the alternating current component. The latter of the above methods, however, is undesirable.

It is, therefore, among the objects of the present invention to provide means including a rotating switching member for the impression of a potential on the control electrodes of an electric current rectifier of the metallic vapor arcing type in which the use of a brush sliding on contacts is avoided.

Another object of the invention is to provide an electric current rectifying system in which the anodes of the rectifier have associated therewith control electrodes and in which means are provided for continuously impressing a negative potential bias on the control electrodes and for intermittently impressing a high frequency positive potential on such control electrodes by the use of a rotating interrupter without sliding contacts.

Another object of the invention is to provide an electric current rectifying system in which the anodes of the rectifier have associated therewith control electrodes and in which means are provided for continuously impressing a negative direct current potential and for intermittently impressing an alternating current potential on the control electrodes in sequence and in synchronism with the potential of an alternating current line supplying the rectifier.

Figure 2:
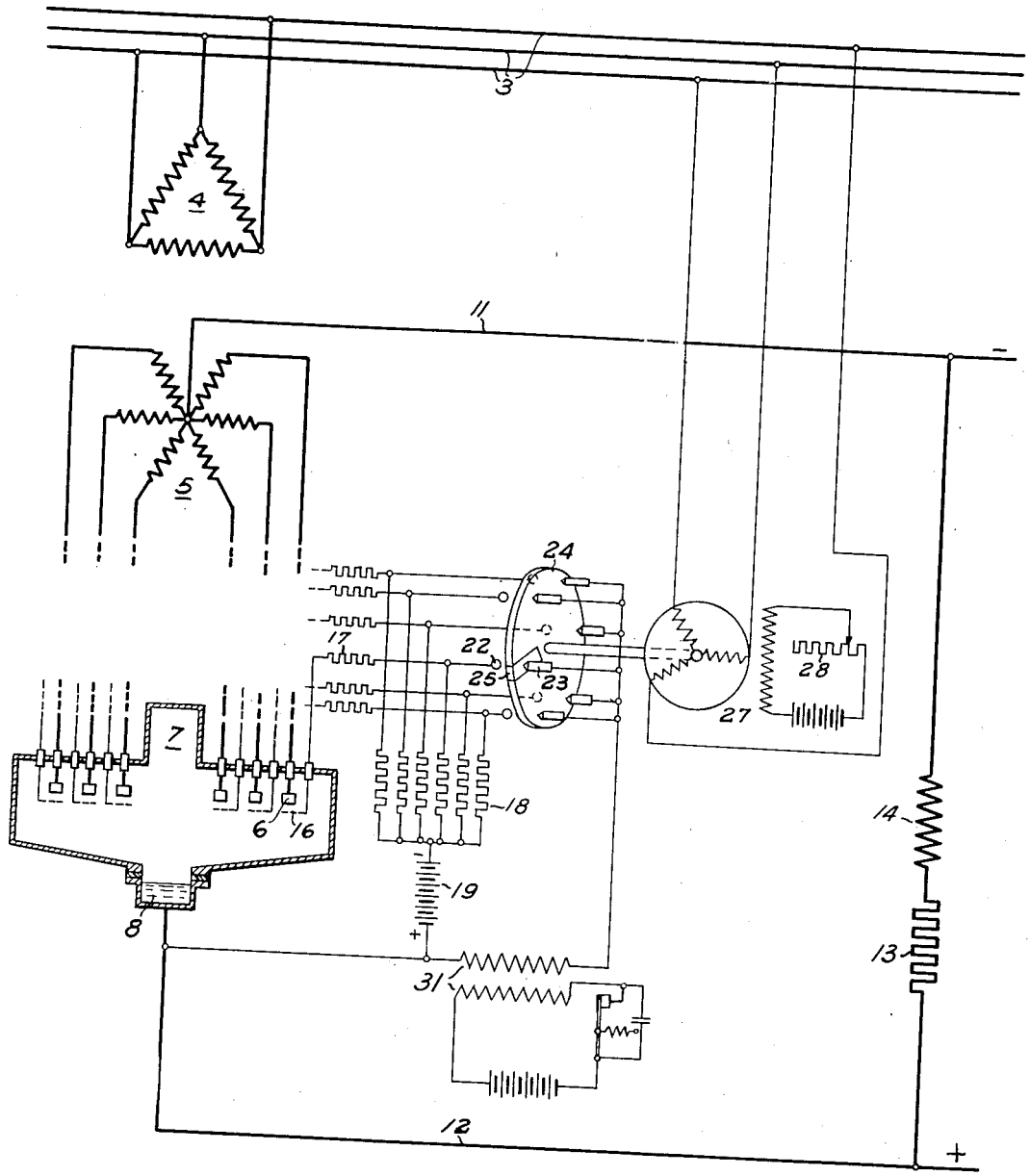

Objects and advantages other than those above set forth will be apparent from the following description when read in connection with the accompanying drawings in which:

Figure 1 diagrammatically illustrates an electric current rectifying system employing a rectifier of the metallic vapor arcing type having anodes with associated control electrodes to which a combined alternating current and direct current control potential is applied, such control potential being controlled to secure intermittent impression of a positive potential relative to the cathode potential on the control electrodes; and Fig. 2 diagrammatically illustrates a modified embodiment of an electric current rectifying system generally similar to that above described.

Referring more particularly to the drawings by characters of reference, the reference numeral 3 designates an alternating current supply line connected with the primary winding 4 of a transformer. The secondary winding 5 of the transformer is connected with anodes 6 of an electric current rectifier generally designated at 7 and having a cathode 8 of vaporizable material such as mercury. A conductor 11 connected with the neutral point of the transformer secondary winding 5 and a conductor 12 connected with a cathode 8 are connected with and supply direct current from the rectifier 7 to a load indicated by a resistance 13 and a reactance 14.

A control electrode 16 is associated with each of the anodes 6 and is connected through a resistance 17 and a reactor 18 with the negative bus bar of the direct current circuit supplying the load which may include a source of direct current, such as a battery 19, for reducing the magnitude of the voltage impressed on the electrodes relative to the voltage of the line 11, 12. Each of the control electrodes is also connected through a distributor, to be more specifically described hereinafter, with a source of alternating current such as a magneto 20 which is connected with the negative direct current bus bar 11, through a reactance 21. The distributor comprises a plurality of arc gaps formed by balls 22 and discharge points 23 arranged adjacent each other but on opposite sides of a disk 24 of insulating material and connected with the control electrodes 16 and the magneto 20, respectively. The disk is formed with one or more current conductive portions dependent on the order in which the control electrodes 16 of the rectifier are to have the positive potential impressed thereon. The conductive portions may be either slots cut in the disk or may be inserts of conductive material arranged to extend through the disk. The disk is arranged to be rotated by a synchronous motor 27 connected with the supply line 3 and having a variable resistance 28 in its excitation circuit by which the lag of the motor, and thereby the lag of the distributor brush 24, relative to the phases of the voltages of winding 5 may be controlled. The balls 22 are preferably chromium or platinum plated to resist the destructive action of the sparking thereon.

In operation, a negative bias relative to the potential of the cathode is continuously impressed on the control electrodes 16 from the negative conductor 11 of the line through battery 19. It is, however, desired to impress a positive bias on the control electrodes periodically from the magneto 20 to permit the associated anodes to pick up an arc, maintained within the rectifier, in a predetermined sequence. Such periodic series of impulses are obtained by rotation of disk 24 which permits flashing over between the electrodes of the spark gap opposite the conductive portion 25 of the disk. Control of the speed of rotation of the disk thus controls the potential on the control electrodes which in turn controls the picking up of the arc by the anodes.

The modified embodiment shown in Fig. 2 is similar to that in Fig. 1 with the exception that the battery 19 is connected with the cathode 8 and that the high frequency alternating current is supplied from a double winding induction coil 31 rather than from the magneto 20.

It will be seen that the present invention has all the advantages of simplicity, certainty and exactness in operation of a distributor for controlling the application of a positive potential on the control electrodes of a rectifier. Sliding contact of a brush with a series of contacts is avoided thereby avoiding the danger of sticking contacts and eliminating the necessity for frequent inspection and repair of the contacting portions of a switch. The movable portion of the distributor rotates freely in air so that the motor 27 need be only of sufficient size to overcome the air and bearing friction.

Although but a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. In an electric current rectifying system, an electric current rectifier of the metallic vapor arcing type having anodes with associated control electrodes and a cathode, means for constantly impressing a negative potential relative to cathode potential on the control electrodes, a source of potential, spark gaps connected with the control electrodes and with said source, and means associated with said spark gaps to cause intermittent flash over thereof.

2. In an electric current rectifying system, an electric current rectifier of the metallic vapor arcing type having anodes with associated control electrodes and a cathode, means for constantly impressing a direct current negative potential on the control electrodes, a source of high frequency potential, spark gaps connected with the control electrodes and with said source, and means associated with said spark gaps to cause intermittent sequential flash over thereof.

3. In an electric current rectifying system, an electric current rectifier of the metallic vapor arcing type having anodes with associated control electrodes and a cathode, means for constantly impressing a direct current negative potential on the control electrodes, a source of potential, spark gaps connected with the control electrodes and with said source, and means arranged between said spark gaps to cause intermittent flash over thereof.

4. In an electric current rectifying system, an electric current rectifier of the metallic vapor arcing type having anodes with associated control electrodes and a cathode, means for constantly impressing a negative potential on the control electrodes, a source of potential, spark gaps connected with the control electrodes and with said source, and a disk having a conductive portion, said disk being arranged between the electrodes of said spark gaps to cause flash over only of the spark gap opposite the conductive portion thereof.

5. In an electric current rectifying system, an electric current rectifier of the metallic vapor arcing type having anodes with associated control electrodes and a cathode, means for constantly impressing a negative potential on the control electrodes, a source of potential, spark gaps connected with the control electrodes and with said source, means associated with said spark gaps to cause intermittent flash over thereof, and means for operating the last said means.

6. In an electric current rectifying system, an electric current rectifier of the metallic vapor arcing type having anodes with associated control electrodes and a cathode, means for constantly impressing a negative potential on the control electrodes, a source of potential, spark gaps connected with the control electrodes and with said source, a disk arranged between the electrodes of said spark gaps to control the flash over thereof, and a motor operated in synchronism and in phase with a predetermined frequency to rotate said disk.

7. In an electric current rectifying system, an alternating current supply line, an electric current rectifier of the metallic vapor arcing type connected with said line, said rectifier having anodes with associated control electrodes and a cathode, a source of direct current potential having the negative terminal thereof continuously connected with the control electrodes, spark gaps each having one electrode thereof connected with each of the control electrodes, a source of high frequency current connected with the other electrodes of said spark gaps, and means for sequentially controlling the flash over of said spark gaps in synchronism and in phase with said supply line.

8. In an electric current rectifying system, an alternating current supply line, an electric current rectifier of the metallic vapor arcing type connected with said line, said rectifier having anodes with associated control electrodes and a cathode, a source of direct current potential having the negative terminal thereof continuously connected with the control electrodes, spark gaps each having one electrode thereof connected with each of the control electrodes, a magneto connected with and supplying current to the other electrodes of said spark gaps, and means for sequentially controlling the flash over of said spark gaps in synchronism and in phase with said supply line.

9. In an electric current rectifying system, an alternating current supply line, an electric current rectifier of the metallic vapor arcing type connected with said line, said rectifier having anodes with associated control electrodes and a cathode, a source of direct current potential having the negative terminal thereof continuously connected with the control electrodes, spark gaps each having one electrode thereof connected with each of the control electrodes, an induction coil connected with and supplying current to the other electrodes of said spark gaps, and means for sequentially controlling the flash over of said spark gaps in synchronism and in phase with the potential in said supply line.

JULIUS JONAS.